United States Patent [19]
Christensen

[11] 3,891,969
[45] June 24, 1975

[54] SYNDROME LOGIC CHECKER FOR AN ERROR CORRECTING CODE DECODER

[75] Inventor: Bruce A. Christensen, Minneapolis, Minn.

[73] Assignee: Sperry Rand Corporation, New York, N.Y.

[22] Filed: Sept. 3, 1974

[21] Appl. No.: 503,011

[52] U.S. Cl. .......... 340/146.1 AL
[51] Int. Cl. .......... G06f 11/10
[58] Field of Search .......... 340/146.1 AL, 146.1 AV, 340/172.5; 235/153 BG

[56] References Cited

UNITED STATES PATENTS

| | | | |
|---|---|---|---|
| 3,573,728 | 4/1971 | Kolankowsky | 340/146.1 AL |
| 3,634,665 | 1/1972 | Carter et al. | 235/153 BG |
| 3,825,894 | 7/1974 | Johnson, Jr. | 235/153 BG |

OTHER PUBLICATIONS

Boden, Self-Checked Error-correction Code Generator, ECC Comparer, Error Syndrome and Data Bit Corrector, IBM Tech. Disclosure Bulletin, Vol. 15, No. 5, October, 1972, pp. 1549–1551.

Zook, ECC and Parity Domain Conversion Checking, IBM Tec. Disclosure Bulletin, Vol. 12, No. 10, March 1970, pp. 1647–1649.

*Primary Examiner*—Charles E. Atkinson
*Attorney, Agent, or Firm*—Kenneth T. Grace; Thomas J. Nikolai; Marshall M. Truex

[57] ABSTRACT

A checking circuit for the decoder of an error correcting code and a method of the designing thereof is disclosed. The method involves an algorithm that checks the syndrome generator network logic of the decoder. The syndrome checker includes a parity predict network and a parity check network in which the parity predict network is a parity tree whose terms in combination with the terms that define the syndrome generator logic meet the properties of the algorithm.

2 Claims, 3 Drawing Figures

SYNDROME LOGIC CHECKER FOR AN ERROR CORRECTING CODE DECODER

BACKGROUND OF THE INVENTION

In the prior art it is known to design error-free decoders of, e.g., single-error-correcting, double-error-detecting codes. In the publication "Error-Free Decoding for Failure-Tolerant memories," W. C. Carter, et al, IEEE International Computer Conference Proceedings, June, 1970, pp. 229–239, there are disclosed methods of designing such self-testing error detecting circuits. However, such prior art circuits do not provide a check of the final output of the syndrome generating circuit, i.e., do not provide a complete error check of the syndrome output. The present invention is directed toward such a checker.

SUMMARY OF THE INVENTION

The method of the present invention includes an algorithm that is utilized to check the output of the syndrome generator network of a decoder of a data processing system that incorporates an error detecting code. The decoder accepts a binary word that includes information bits and check bits and generates therefrom, in a syndrome generator network, syndrome bits that are themselves subsequently decoded in an error-correcting, error-detecting network to locate and correct correctable errors in the binary word. The checker of the present invention is coupled to the syndrome generator network to detect errors in the generation of the syndrome bits from the binary word.

The syndrome checker of the present invention includes a parity predict network and a parity check network. The parity predict network is a parity tree — it is to be appreciated that $k$-input Exclusive OR gates, where $k$ is a positive integer of 3 or greater, are synonymous to $k$-input parity gates, and may be comprised of the number ($k$-1) of two-input Exclusive OR gates — see the text "Digital Design," Wiley-Interscience, 1971, R. K. Richards, pp. 198–200 — whose input terms are bits of the binary word and whose output, along with the output of the syndrome generator network (which may include an overall parity network) are inputs to the parity check network, the output of which indicates error vel non in the syndrome bits. The parity predict network is a parity tree whose terms are such that the following properties hold for it in combination with the syndrome generator network:

1. Each input to the syndrome generator network appears in the syndrome generator equations and the parity predict equations an even number of times.
2. The output of every internal gate within the syndrome generator network and the parity predict network has an odd fan-out.

DESCRIPTION OF THE PREFERRED EMBODIMENTS

As stated hereinabove, the present invention is directed toward a digital data processing system that includes error coding for the detection of errors caused during the transmission, manipulation, etc., of multibit words. In the system to which the present invention is directed, there is utilized a multibit binary word that includes a plurality of information bits and, preferably, a plurality of check bits. A decoder accepts the binary word and generates from it, in a syndrome generator network, a plurality of syndrome bits which are themselves subsequently decoded in an error-correcting, error-detecting network to locate and correct errors in the binary word. The present invention provides a means of determining if the syndrome bits, as generated from the bits of the binary word, are themselves correct or error-free.

The syndrome checker of the present invention is comprised of two separate logic networks both of which are formed of Exclusive OR's; a parity predict network, and a parity check network. The associated syndrome generator network, which is also formed of Exclusive OR's, includes two or more output gates, each of which is normally formed of a parity tree (of Exclusive OR's) of three or more inputs, which inputs are selected ones of the bits of the binary word, or, alternatively, each of the inputs may itself be the output of one or more internal gates — which internal gates may include a parity tree (of Exclusive OR's) — i.e., internal gates are gates that are electrically intermediate the bits of the binary word and the inputs to the output gates. The output of each internal and external gate must have an odd fan-out.

The parity predict network is of the same logic level as are the output gates of the syndrome generator network and it has as its inputs certain bits of the binary word directly coupled thereto or through internal gates of the syndrome generator network. The parity check network has as its inputs the outputs of the output gates of the syndrome generator network, i.e., the syndrome bits, plus the output of the parity predict network, the parity predict bit L. The output of the parity check network is the syndrome check bit $C_S$ indicating that an error vel non appears in the syndrome bits. Additionally, if the binary word further includes a separate parity bit P within the check bits an overall parity network may be included at the same logic level as the output gates of the syndrome generator network and the parity predict network with its output, the overall parity bit $P_0$, coupled as a further input to the parity check network.

Figure 1:
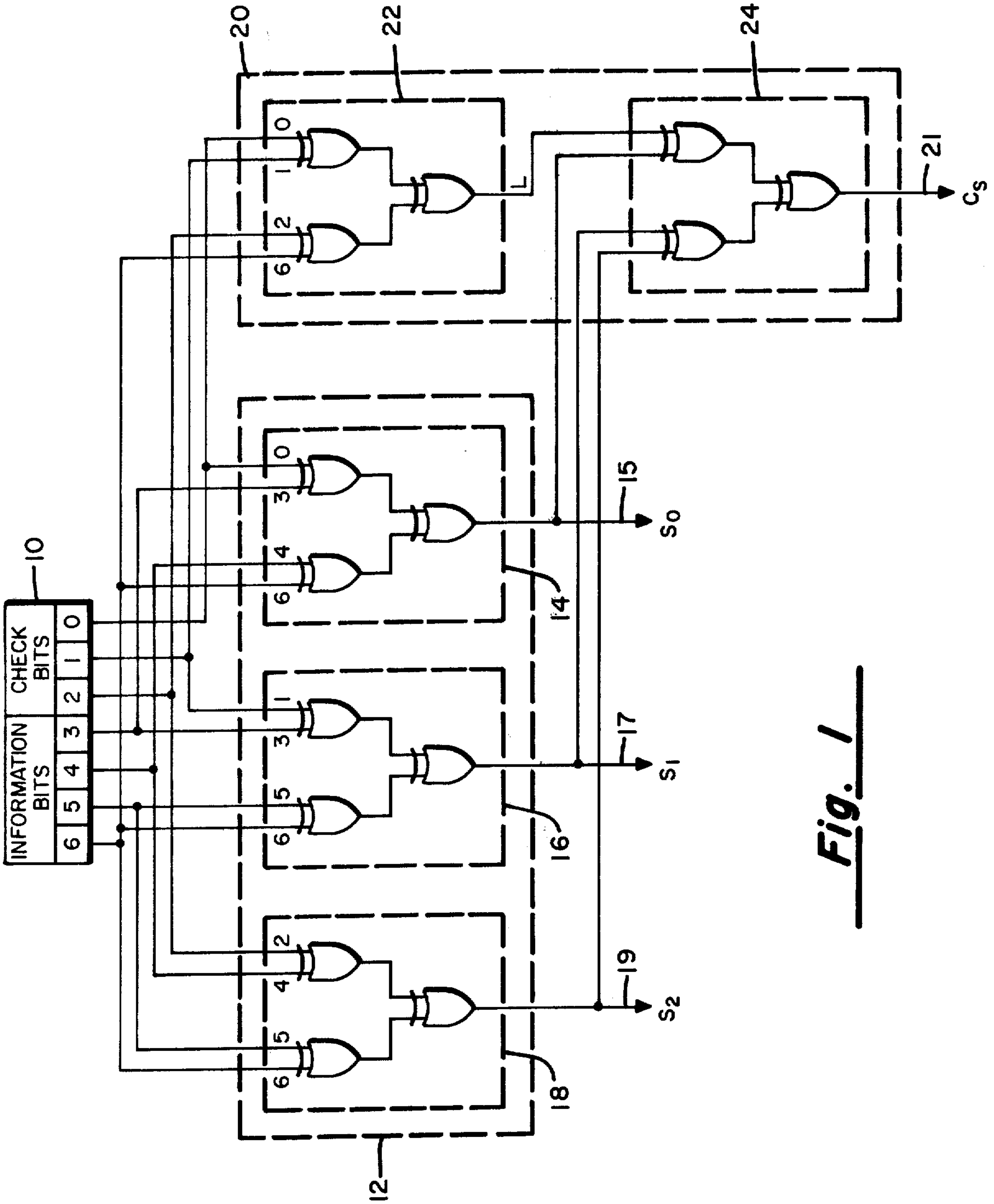
FIG. 1 is a first embodiment of the syndrome checker of the present invention.

With particular reference to FIG. 1 there is presented an illustration of a first embodiment of the present invention. In this embodiment there is illustrated a holding register 10 for the temporary storage of a multibit binary word of 7 bits in length, bit 6 – bit 0 in which the most significant bit (MSB) is bit 6 and which binary word is comprised of information bits 6, 5, 4, 3 and check bits 2, 1, 0 held in the respectively noted stages of holding register 10. Further illustrated is a syndrome generator network 12 comprised of the output gates 14, 16, 18. Syndrome generator network 12 receives as inputs thereto the bits of the binary word in holding register 10 for producing on the respectively associated output lines 15, 17, 19 from output gates 14, 16, 18, respectively, the respectively associated syndrome bits $S_0S_1$, $S_2$, respectively. As stated hereinabove, the syndrome bits $S_0$, $S_1$, $S_2$ are subsequently decoded in a error-correcting, error-detecting network to locate and correct errors in the binary word held in holding register 10.

Associated with holding register 10 and syndrome generator network 12 and electrically coupled thereto is syndrome checker 20 which is comprised of a parity predict network 22 and a parity check network 24. Parity predict network 22 is of the same logic level as are output gates 14, 16, 18 of syndrome generator network 12 and it has as its inputs certain bits of the binary word, held in holding register 10, directly coupled thereto. Parity check network 24 has as its inputs the outputs of output gates 14, 16, 18 of syndrome generator network 12, i.e., the syndrome bits $S_0$, $S_1$, $S_2$, plus the output of parity predict network 22, parity predict bit L. The output of parity check network 24, which is also the output of syndrome checker 20, is the sydrome check bit $C_S$ which indicates that an error vel non appears in the syndrome bits.

The embodiment of FIG. 1 is that of a syndrome generator network 12 adapted to operate upon a Hamming (7, 4) code — see the Hamming, et al, U.S. Pat. No. Re, 23,601. Applicant's invention is in the nature of a method of, or algorithm for, designing a syndrome checker for any syndrome generator network having any error code, from a network of Exclusive OR's. The parity predict network is a network of Exclusive OR's the terms of whose logic equations when combined with the terms of the logic equations of the syndrome generator network must meet the following conditions:

1. Each input to the syndrome generator network, i.e., each bit of the binary word that is coupled to the syndrome generator network and from which the syndrome bits are to be generated, appears in the syndrome generator network logic equations and the parity predict network logic equations an even number of times.
2. The output of every internal gate, i.e., gates that are electrically intermediate the bits of the binary word and the inputs to the output gates, has an odd number of fan-outs.

Condition *1* ensures that each bit will have even parity so that if any gate within the syndrome generator network and the parity predict network causes an error, that error will be detected. Condition 2 ensures that any error caused by a single gate within the syndrome generator network which is not fully bit-sliced will be detected.

The syndrome generator network 12 of FIG. 1, using the Hamming (7, 4) code, has the following logic equations, where the "+" sign implies the Exclusive OR function:

$$S_2 = b_6 + b_4 + b_2$$
$$S_1 = b_6 + b_5 + b_3 + b_1$$
$$S_O = b_6 + b_4 + b_3 + b_O.$$

Evaluating the terms of such logic equations considering condition 1 above, the parity predict network 22 is seen to have the following logic equation, $$L = b_6 + b_2 + b_1 + b_O.$$

Further, it can be seen that no internal gates are utilized in this embodiment. Parity check network 24 has as its inputs the outputs of the output gates 14, 16, 18 of syndrome generator network 12, i.e., syndrome bits $S_0S_1$, $S_2$, plus the output of parity predict network 22, parity predict bit L. The output of parity check network 24, and also the output of syndrome checker 20, is syndrome check bit $C_S$ which syndrome check bit indicates that an error vel non appears in the syndrome bits $S_O$, $S_1$, $S_2$.

Figure 2:
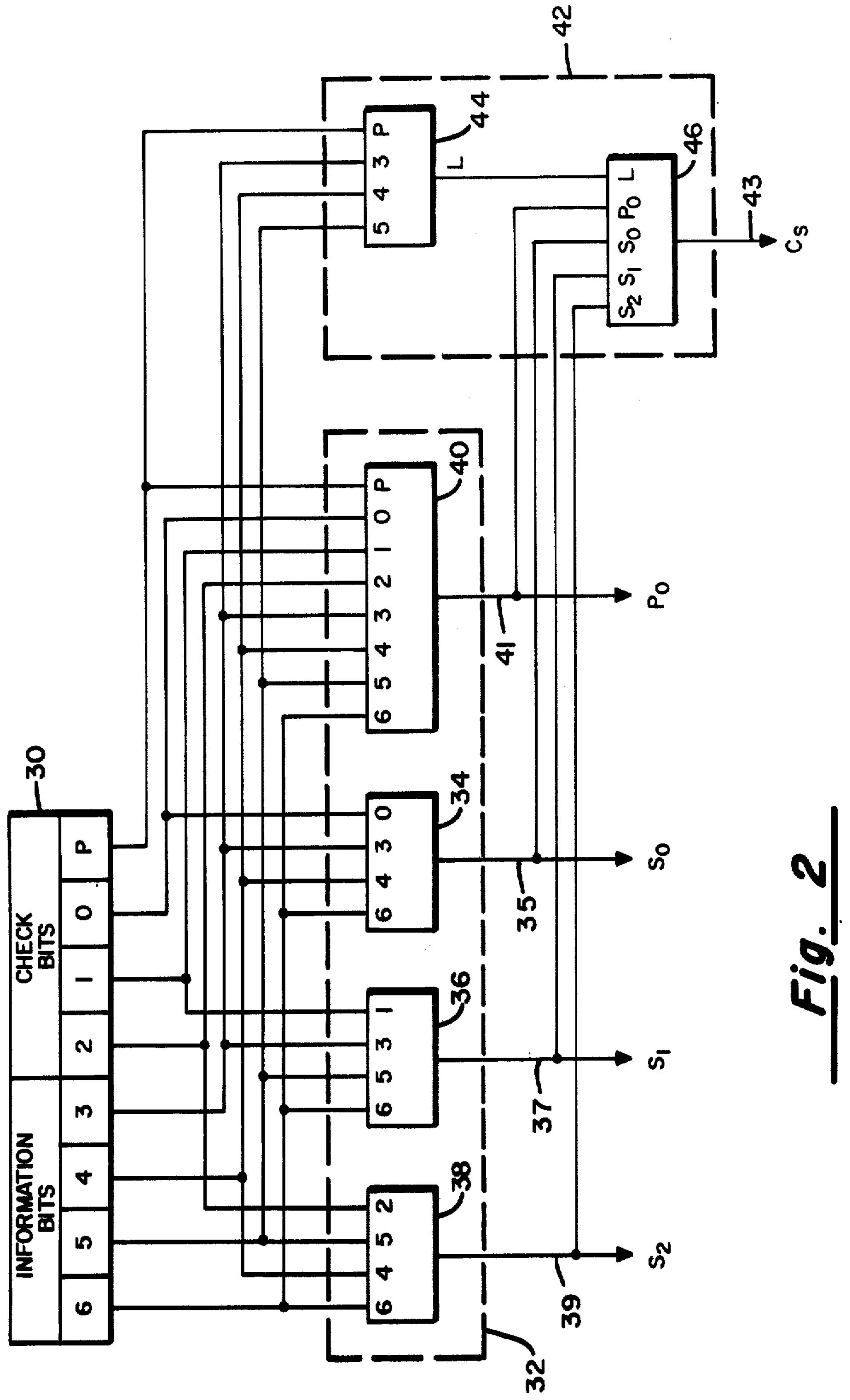
FIG. 2 is a second embodiment of the syndrome checker of the present invention.

With particular reference to FIG. 2 there is presented an illustration of a second embodiment of the present invention. In this embodiment there is illustrated a holding register 30 for the temporary storage of a multibit binary word of 8 bits in length, bit 6 – bit O, and bit P, the parity bit, and in which the most significant bit (MSB) is bit 6 and which binary word is comprised of the information bits 6, 5, 4, 3 and check bits 2, 1, O, P held in the respectively noted stages of holding register 30. Further illustrated is a syndrome generator network 32 comprised of the output gates 34, 36, 38. Syndrome generator network 32 receives as inputs thereto bits 6 – bit O of the binary word in holding register 30 for producing on the respectively associated output lines 35, 37, 39 from output gates 34, 36, 38, respectively, the respectively associated syndrome bits $S_O$, $S_1$, $S_2$, respectively associated syndrome bits $S_O$, $S_1$, $S_2$, respectively. In this second illustrated embodiment, the output gates 34, 36, 38 of syndrome generator network 32 may be identical to the respectively similar elements of the embodiment of FIG. 1.

Included within syndrome generator network 32, and at the same logic level as are output gates 34, 36, 38, is overall parity network 40. Overall parity network 40 receives as its inputs all the bits of the binary word held in holding register 30 including the parity bit P which is not coupled to syndrome generator network 32. Overall parity network 40 produces as an output signal therefrom overall parity bit $P_O$ which indicates that a parity error vel non appears in the binary word held in holding register 30.

Associated with holding register 30 and syndrome generator network 32 and electrically coupled thereto is syndrome checker 42 which is comprised of parity predict network 44 and parity check network 46. Parity predict network 44 is of the same logic level as are output gates 34, 36, 38 and overall parity network 40 of syndrome generator network 32 and it has as its inputs certain bits of the binary word, held in holding register 30, directly coupled thereto. Parity check network 36 has as its inputs the outputs of output gates 34, 36, 38, i.e., syndrome bits $S_O$, $S_1$, $S_2$, the output of overall parity network 40, overall parity bit $P_O$, plus the output of parity predict network 44, parity predict bit L. The output of parity check network 46, which is also the output of syndrome checker 44, is a syndrome check bit $C_S$ which indicates that an error vel non appears in the syndrome bits.

The syndrome generator network 32 of FIG. 2, using the Hamming single-error-correcting, double-error-detecting (SEC-DED) (8, 4) code, has the following logic equations:

$$S_2 = b_6 + b_5 + b_4 + b_2$$
$$S_1 = b_6 + b_5 + b_3 + b_1$$
$$S_O = b_6 + b_4 + b_3 + b_O$$

which logic equations are the same logic equations used to define syndrome generator network 12 of FIG. 1. Further, overall parity network 40 has the following logic equation $$P_O = b_6 + b_5 + b_4 + b_3 + b_2 + b_1 + b_O + b_p.$$

Evaluating the terms of such logic equations considering Condition 1 above the parity predict network 44 is seen to have the following logic equation, $$L = b_5 + b_4 + b_3 + b_p.$$

Further, it can be seen that no internal gates are utilized in this embodiment. Parity check network 46 has as its inputs the outputs of the output gates 34, 36, 38, i.e., syndrome bits $S_O$, $S_1$, $S_2$, the output of overall parity network 40, overall parity bit $P_O$, plus the output of parity predict network 44, parity predict bit L. The output of parity check network 46, and also the output of syndrome checker 42, is syndrome check bit $C_S$ which syndrome check bit indicates that an error vel non appears in the syndrome bits $S_O$, $S_1$, $S_2$.

Figure 3:
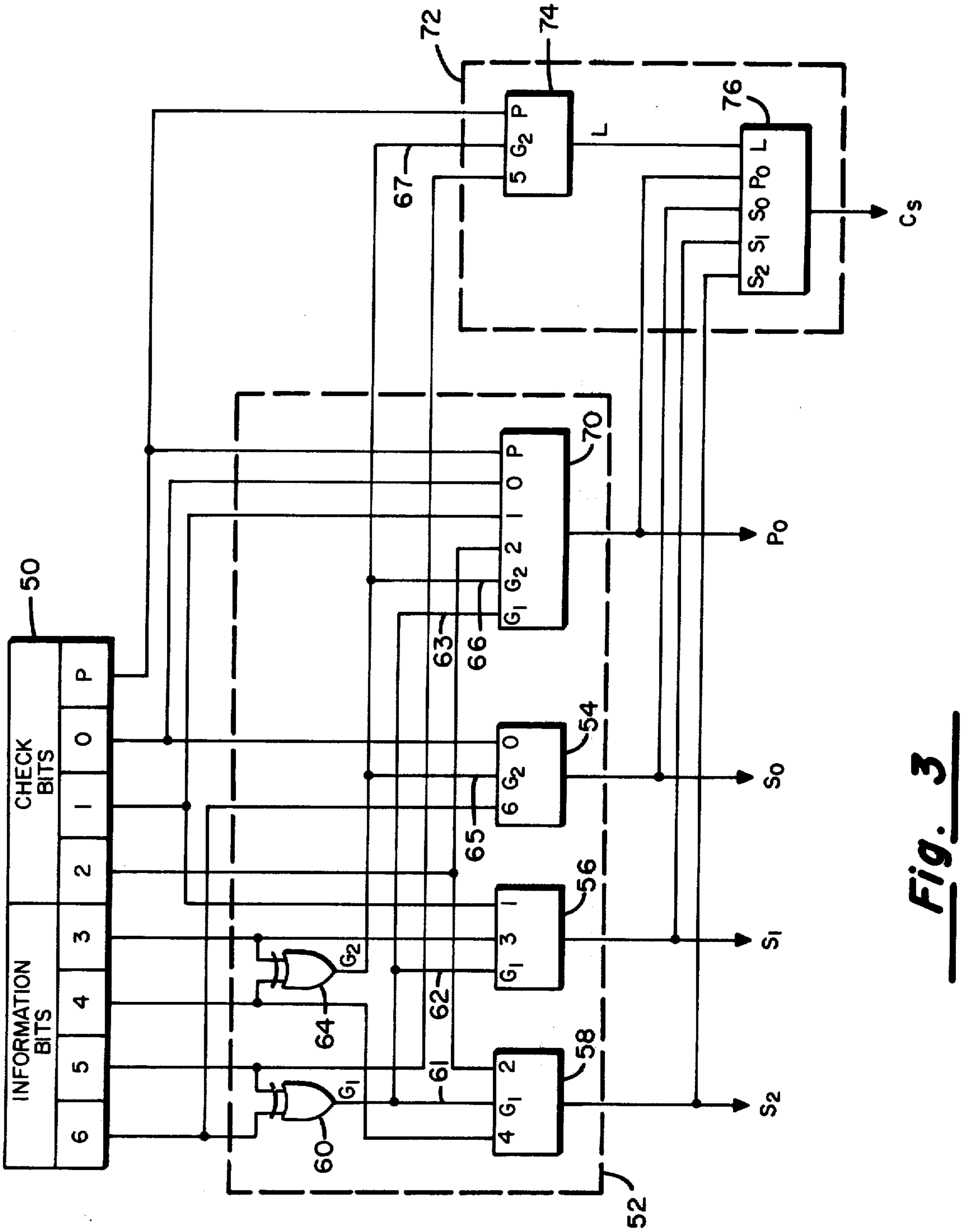
FIG. 3 is a third embodiment of the syndrome checker of the present invention.

With particular reference to FIG. 3 there is presented an illustration of a third embodiment of the present invention. In this embodiment there is illustrated a holding register 50 for the temporary storage of a multibit binary word of 8 bits in length, bit 6 – bit O and a parity bit P such as discussed with particular reference to holding register 30 of FIG. 2. This embodiment which is a slight modification of the embodiment of FIG. 2, illustrates a syndrome generator network 52 comprised of output gates 54, 56, 58, two internal gates 60, 64, and overall parity network 70. Internal gates 60, 64 are utilized within syndrome generator 52 to reduce the number of inputs to output gates 54, 56, 58, and overall parity network 70 of syndrome generator network 52, and parity predict network 74 of syndrome checker 72 while illustrating an example of Condition 2 above.

In this example, internal gate 60 has the logic equation $G_1 = b_6 + b_5$ while internal gate 64 has the logic equation $G_2 = b_4 + b_3.$ With internal gate 60 having an odd fan-out of 3 being coupled to output gate 58 via line 61, to output gate 56 via line 62 and to overall parity network 70 via line 63 and with internal gate 64 having an odd fan-out of 3 being coupled to output gate 54 via line 65, to overall parity network 70 via line 66 and to parity predict network 74 via line 67 it can be seen that Condition 2 above is met.

What is claimed is:

1. In combination with a syndrome generator network that generates syndrome bits from a vinary word that includes information bits and check bits, a syndrome checker for detecting errors in the generation of said syndrome bits from said binary word, said syndrome checker comprising:

a parity predict network for generating a parity predict bit;

a parity check network for generating a syndrome check bit;

first means for coupling the bits of said binary word as inputs to said syndrome generator network and to said parity predict network in accordance with the following conditions:

1. each bit of the binary word appears in the syndrome generator network logic equations and the parity predict network logic equations an even number of times;
2. the output of each gate within the syndrome generator network and the parity predict network has an odd fan-out;

second means coupling said syndrome bits and said parity predict bit as inputs to said parity check network for generating as an output therefrom alternative signals for indicating that said syndrome bits are either correct or not correct.

2. In combination with a syndrome generator network, including an overall parity network, that generates the syndrome bits $S_{N-1}, \ldots S_O$ and an overall parity bit $P_O$ from a binary word that includes information bits and check bits including a parity bit, a syndrome checker for detecting errors in the generation of said syndrome bits from said binary word, said syndrome checker comprising:

a parity predict network for generating a parity predict bit L;

a parity check network for generating a syndrome check bits $C_S$;

first means for coupling the bits of said binary word as inputs to said syndrome generator network and to said parity predict network in accordance with the following conditions,

1. each bit of the binary word appears in the logic equations of the syndrome generator network and the parity predict network an even number of times,

2. the output of each gate within the syndrome generator network and the parity predict network has an odd number of fan-outs;

second means for coupling said overall parity bit $P_O$, said syndrome bits $S_{N-1}, \ldots S_O$ and said parity predict bit L as inputs to said parity check network and generating the syndrome check bit $C_S$ indicating that said syndrome bits $S_{N-1}, \ldots S_O$ are either correct or not correct.

* * * * *

UNITED STATES PATENT OFFICE

CERTIFICATE OF CORRECTION

PATENT NO. : 3,891,969

DATED : June 24, 1975

INVENTOR(S) : Bruce A. Christensen

It is certified that error appears in the above-identified patent and that said Letters Patent are hereby corrected as shown below:

IN THE PRINTED PATENT:

Column 3, Line 52, "$S_2 = b_6 + b_4 + b_2$" should be -- $S_2 = b_6 + b_5 + b_4 + b_2$ --.

Column 6, Line 30, "bits" should be -- bit --.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*